US012693494B2

(12) United States Patent
    Liu et al.

(10) Patent No.: US 12,693,494 B2
(45) Date of Patent: Jul. 28, 2026

(54) CAMERA MODULE AND ELECTRONIC DEVICE HAVING REFLECTING PRISM AND FIXED APERTURE

(71) Applicant: Huawei Technologies Co., Ltd., Shenzhen (CN)

(72) Inventors: Qinghua Liu, Shenzhen (CN); Zhangcheng Li, Shanghai (CN); Zhanli Sun, Shanghai (CN); Yiqin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 18/291,498

(22) PCT Filed: Jul. 20, 2022

(86) PCT No.: PCT/CN2022/106841
    § 371 (c)(1),
    (2) Date: Jan. 23, 2024

(87) PCT Pub. No.: WO2023/005772
    PCT Pub. Date: Feb. 2, 2023

(65) Prior Publication Data
    US 2024/0377611 A1    Nov. 14, 2024

(30) Foreign Application Priority Data
    Jul. 29, 2021    (CN) ........................ 202110867163.X

(51) Int. Cl.
    *G02B 7/00*        (2021.01)
    *G02B 7/18*        (2021.01)
    (Continued)

(52) U.S. Cl.
    CPC ............. *G02B 7/1805* (2013.01); *G03B 5/00* (2013.01); *G03B 13/36* (2013.01); *G03B 17/55* (2013.01); *G03B 2205/003* (2013.01)

(58) Field of Classification Search
    CPC .. G02B 7/1805; G02B 13/065; G02B 27/646; G03B 5/00; G03B 13/36; G03B 17/17;
    (Continued)

(56) References Cited

U.S. PATENT DOCUMENTS

| | | | |
|---|---|---|---|
| 2013/0215525 A1 | 8/2013 | Wang et al. |
| 2015/0172522 A1 | 6/2015 | O'Neill et al. |
| 2020/0209607 A1 | 7/2020 | Hsu et al. |

FOREIGN PATENT DOCUMENTS

| | | |
|---|---|---|
| CN | 107517285 A | 12/2017 |
| CN | 208110149 U | 11/2018 |

(Continued)

OTHER PUBLICATIONS

English Translation of Wang et al., WO 2021/115440 A1 (retrieved from https://patents.google.com) (Year: 2021).*

*Primary Examiner* — Ryan S Dunning
(74) *Attorney, Agent, or Firm* — Slater Matsil, LLP

(57) ABSTRACT

Embodiments of this application provide a camera module and an electronic device. The camera module is configured to be mounted in the electronic device. The camera module includes a bracket, an optical image stabilization motor, an automatic focus motor, a reflecting prism, a camera lens, and a lens holder. The reflecting prism is disposed in the optical image stabilization motor, the camera lens is disposed in the automatic focus motor, and the camera lens is connected to the lens holder. The optical image stabilization motor, the automatic focus motor, and the lens holder are disposed within the bracket and are sequentially arranged in a first direction. The first direction is an optical axis direction of the (Continued)

camera lens, and a plane on which the lens holder is located is disposed perpendicular to the optical axis direction.

18 Claims, 12 Drawing Sheets

(51) Int. Cl.

| | |
|---|---|
| *G02B 13/00* | (2006.01) |
| *G02B 27/64* | (2006.01) |
| *G03B 5/00* | (2021.01) |
| *G03B 13/36* | (2021.01) |
| *G03B 17/17* | (2021.01) |
| *G03B 17/55* | (2021.01) |
| *G03B 30/00* | (2021.01) |
| *H04M 1/02* | (2006.01) |
| *H04N 23/50* | (2023.01) |
| *H04N 23/54* | (2023.01) |
| *H04N 23/55* | (2023.01) |
| *H04N 23/57* | (2023.01) |
| *H04N 23/58* | (2023.01) |

(58) Field of Classification Search

CPC .. G03B 17/55; G03B 30/00; G03B 2205/003; H04M 1/0264; H04N 23/50; H04N 23/54; H04N 23/55; H04N 23/57; H04N 23/58

See application file for complete search history.

(56) References Cited

FOREIGN PATENT DOCUMENTS

| | | | |
|---|---|---|---|
| CN | 109239903 A | 1/2019 | |
| CN | 109557643 A | 4/2019 | |
| CN | 110488451 A | 11/2019 | |
| CN | 211348817 U | 8/2020 | |
| CN | 112995443 A | 6/2021 | |
| CN | 115606193 A | 1/2023 | |
| JP | 2020126231 A | 8/2020 | |
| WO | WO-2021115440 A1 * | 6/2021 | ............. H04N 23/00 |

* cited by examiner

CAMERA MODULE AND ELECTRONIC DEVICE HAVING REFLECTING PRISM AND FIXED APERTURE

CROSS-REFERENCE TO RELATED APPLICATIONS

This application is a national stage of International Application No. PCT/CN2022/106841, filed on Jul. 20, 2022, which claims priority to Chinese Patent Application No. 202110867163.X, filed on Jul. 29, 2021. Both of the aforementioned applications are hereby incorporated by reference in their entireties.

TECHNICAL FIELD

This application relates to the technical field of electronic devices, and in particular, to a camera module and an electronic device.

BACKGROUND

With popularization of electronic devices, a user has an increasingly high requirement on aesthetics of the electronic devices, so that the electronic devices, such as smartphones and other products, gradually become thinner. To enable the electronic device to have a function of a telephoto camera without increasing a thickness of the electronic device, a periscope camera module may be disposed, so that an optical axis direction of a camera lens is perpendicular to a thickness direction of the electronic device. For the periscope camera module, a size of the camera lens affects a stacking height of the module, and therefore affects the thickness of the electronic device.

SUMMARY

Embodiments of this application provide a camera module and an electronic device, to reduce a stacking height.

An aspect of embodiments of this application provides a camera module, configured to be mounted in an electronic device. The camera module includes: a bracket, an optical image stabilization motor, an automatic focus motor, a reflecting prism, a camera lens, and a lens holder.

The reflecting prism is disposed in the optical image stabilization motor, the camera lens is disposed in the automatic focus motor, the camera lens is connected to the lens holder, the optical image stabilization motor, the automatic focus motor, and the lens holder are disposed within the bracket and are sequentially arranged in a first direction, the first direction is an optical axis direction of the camera lens, and a plane on which the lens holder is located is disposed perpendicular to the optical axis direction.

The camera lens includes a plurality of lenses that are sequentially arranged from a light inlet side to a light outlet side, a side that is of the camera lens and that faces the reflecting prism is the light inlet side, a lens in the plurality of lenses that is close to the light inlet side is a first lens, and a stop of the camera lens is disposed on a periphery of the first lens or disposed on a side that is of the first lens and that faces the reflecting prism.

Embodiments of this application provide a camera module. A camera lens stop of a periscope camera module is moved forward, so that a camera lens diameter can be reduced compared with that of a middle stop. In addition, because the camera lens diameter is reduced, a size required by a reflecting prism can be also reduced, so that a stacking height of the periscope camera module is reduced.

In a possible implementation, an aperture of a stop is equal to a diameter of the first lens.

When the aperture of the stop is set to be equal to the diameter of the first lens, an entrance pupil aperture is equal to the diameter of the first lens, and there is no out-of-axis light offset. When the entrance pupil aperture is a determined value, the diameter of the first lens may be reduced, thereby reducing sizes required by the camera lens diameter and the reflecting prism, and reducing the stacking height of the camera module.

In a possible implementation, the camera lens includes a lens tube and the plurality of lenses disposed in the lens tube, a stop entity is a limiting surface of an inner wall of the lens tube, and the limiting surface is disposed on the periphery of the first lens.

The inner wall surface of the lens tube is disposed as the limiting surface, so that the aperture of the stop is equal to the diameter of the first lens, and a structure is easy to implement.

In a possible implementation, a side of a light incident surface of the camera module includes a main region and a sink region, the sink region is disposed around the main region, and a height of the sink region is less than a height of the main region.

The sink region is disposed, so that accommodation space is formed after the camera module is assembled, and the sink region is used to mount another mechanical part, to reduce the stacking height of the camera module and improve structural compactness.

In a possible implementation, the camera module further includes a mechanical part, the mechanical part is mounted on the sink region, and the mechanical part includes a sealing kit or an antenna support.

Disposing of the sealing kit may be used to seal the camera module and a rear cover, and execute a buffer function. Disposing of the antenna support may increase a quantity of antennas and improve antenna performance. Disposing of the mechanical part in the sink region can reduce the stacking height of the camera module, and improve structural compactness.

In a possible implementation, a first sink region, a second sink region, and a third sink region are respectively disposed on the optical image stabilization motor, the automatic focus motor, and the lens holder.

Sink regions are correspondingly disposed on the optical image stabilization motor, the automatic focus motor, and the lens holder, so that an area of the sink regions can be increased, and space utilization can be improved.

In a possible implementation, an edge of the bracket is flush with a surface on which the sink region is located.

The bracket can avoid the mechanical part, and increase a volume of the accommodating space between the camera module and the rear cover, and this facilitates stacking of the mechanical part.

In a possible implementation, a height difference between the sink region and the main region is 1 mm to 2 mm.

The height difference between the sink region and the main region may be 1 mm to 2 mm, so that a stacking height of the entire system can be reduced by 1 mm to 2 mm.

In a possible implementation, the camera module further includes a reinforcement board, a first reinforcement adhesive, a second reinforcement adhesive, and a Mylar film, a frame of the reinforcement board is bonded to the bottom of the optical image stabilization motor through the first reinforcement adhesive, and the Mylar film is bonded to the reinforcement board through the second reinforcement adhesive.

Disposing of the reinforcement structure can enhance stability of a position sensor of the optical image stabilization motor relative to a position of a motor mover, and ensure performance stability of the optical image stabilization motor. In addition, a stacking size can be reduced, and a surface damage problem caused by an injection molding process can be avoided.

In a possible implementation, the Mylar film may be a copper foil.

The copper foil is disposed as the Mylar film, so that heat dissipation efficiency can be improved while a reinforcement function and a buffer function are performed.

In a possible implementation, a sum of a thickness of the second reinforcement adhesive and a thickness of the Mylar film is less than or equal to 0.1 mm.

The reinforcement is performed by using the reinforcement adhesive and the Mylar film, and a reinforcement height is extremely small, so that an overall stacking height of the camera module can be effectively reduced.

In a possible implementation, the camera module further includes a base board, the optical image stabilization motor, the automatic focus motor, and the lens holder are separately connected to the base board, the base board is disposed within the bracket, and a plane on which the base board is located is perpendicular to a plane on which the lens holder is located.

Disposing of a position of the base board facilitates proper arrangement of an overall architecture of the camera module, and can reduce an overall volume of the camera module.

Another aspect of embodiments of this application provides an electronic device, including a rear cover and the foregoing camera module. A camera mounting region is disposed on the rear cover, and the camera module is mounted in the camera mounting region.

Embodiments of this application provide a camera module and an electronic device. In an aspect, a stop of a camera lens may be front-facing, to reduce a diameter of the camera lens, to reduce sizes of the camera lens and a reflecting prism. In other words, a stacking height of the module may be reduced from a structure design aspect. In another aspect, a sinking step-shaped structure may be disposed around the camera module. The sink step-shaped structure is used to cooperate with the rear cover, and may stack another mechanical part, that is, the stacking height of the module may be reduced from a stacking cooperation aspect. In still another aspect, three layers of reinforcement structures, namely, a reinforcement board, a reinforcement adhesive, and a Mylar film, are disposed at the bottom of an optical image stabilization motor, so that a stacking thickness of the reinforcement structure at the bottom of the optical image stabilization motor can be reduced, that is, the stacking height of the module can be reduced from a processing technology aspect. Therefore, a compact periscope camera module can be provided, and a stacking height of an entire electronic device can be reduced, and this is conducive to a thin design of the electronic device.

4

Figure 2:
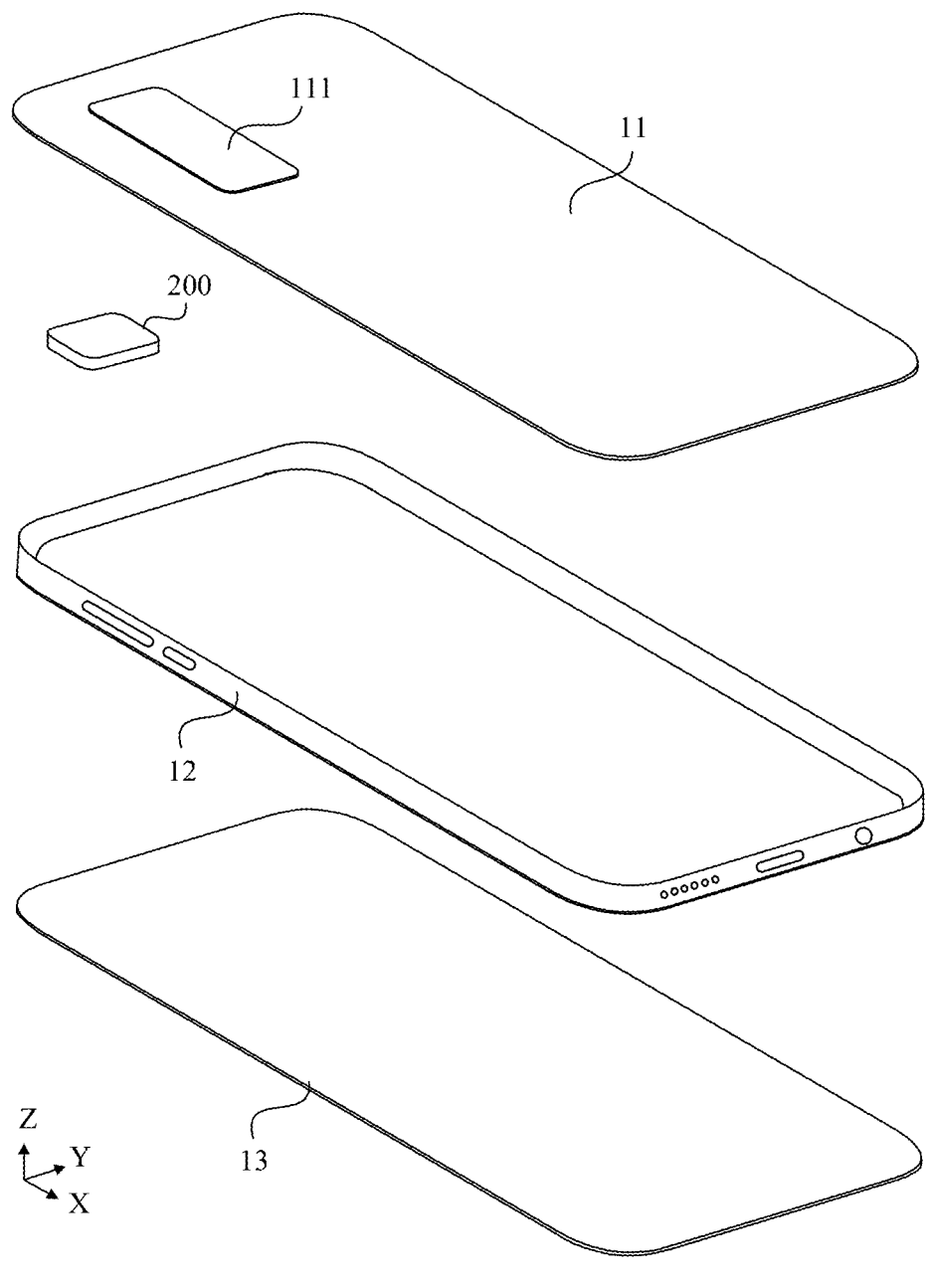
Figure 3:
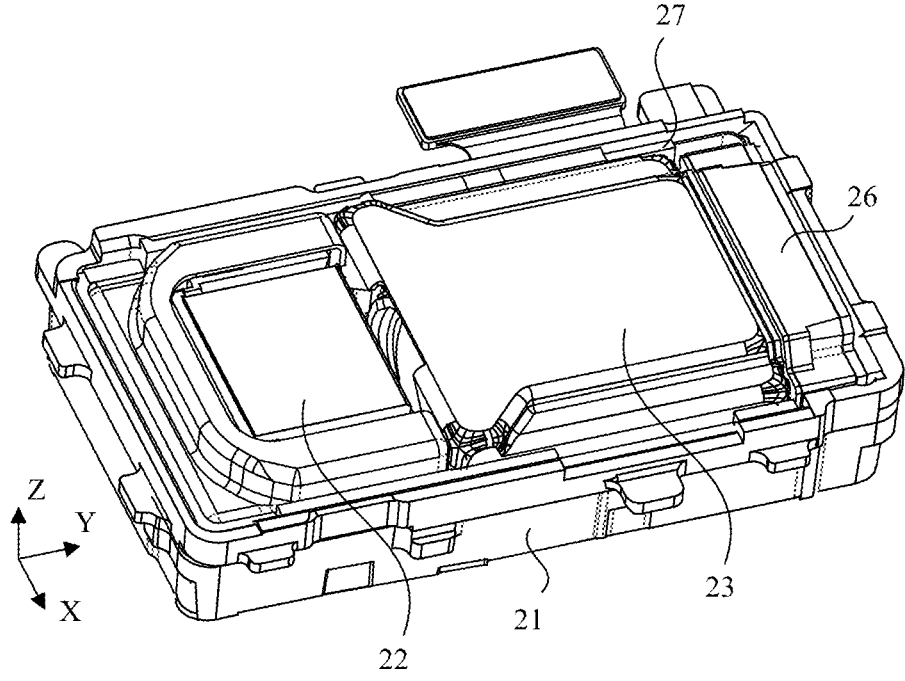
Figure 4:
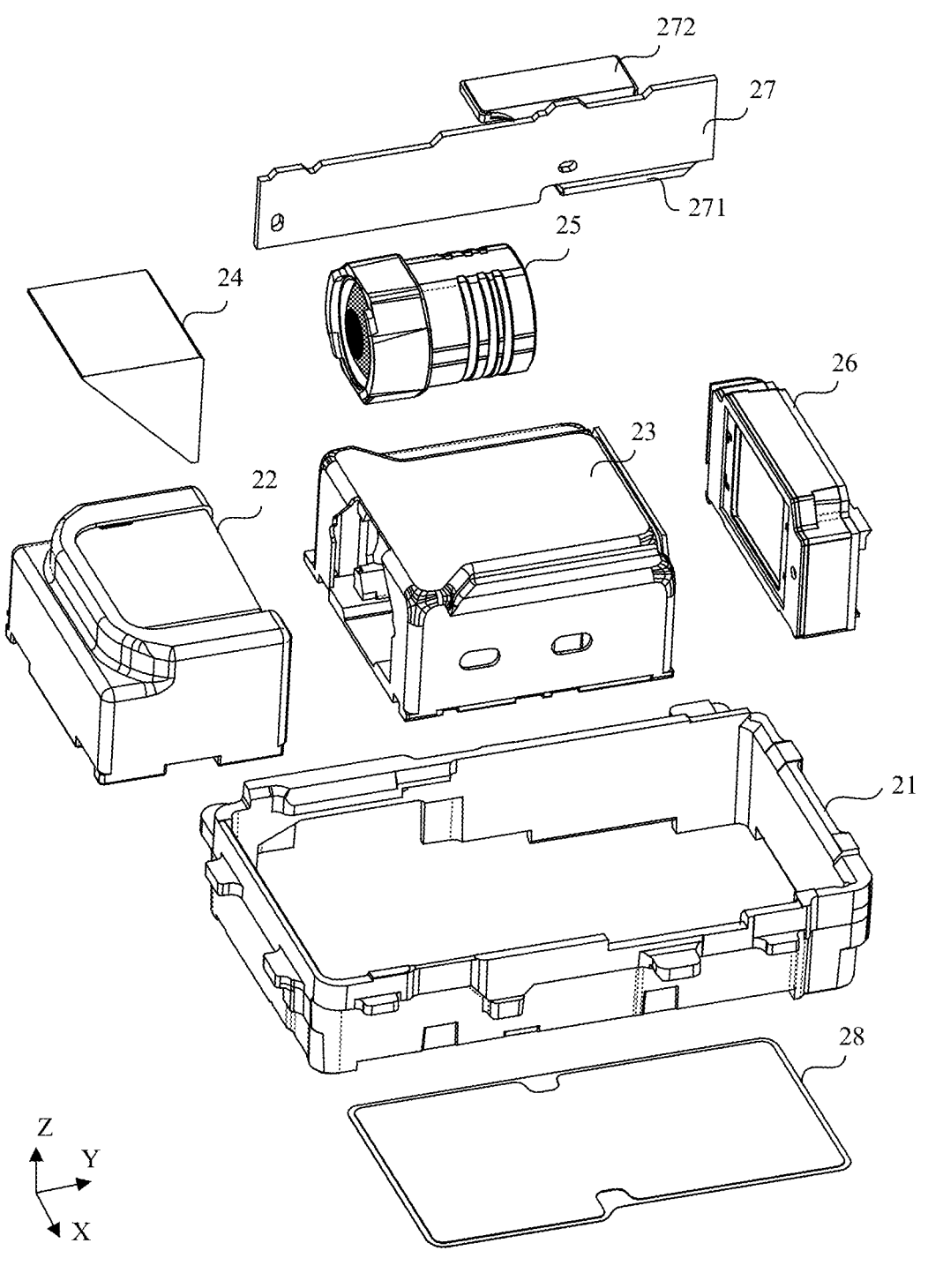
Figure 5:
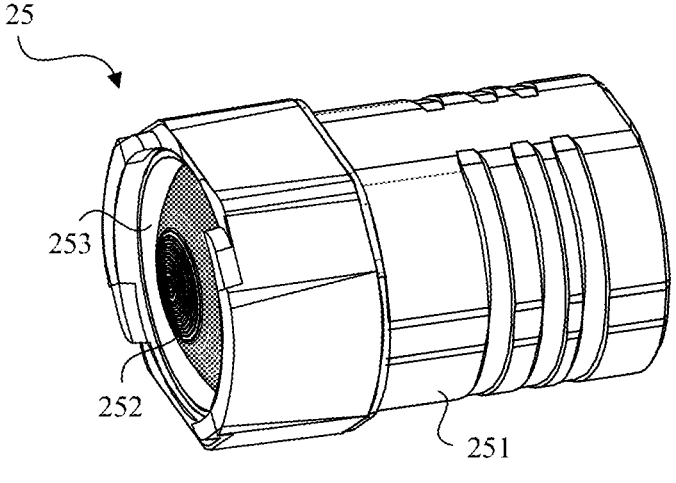
Figure 6:
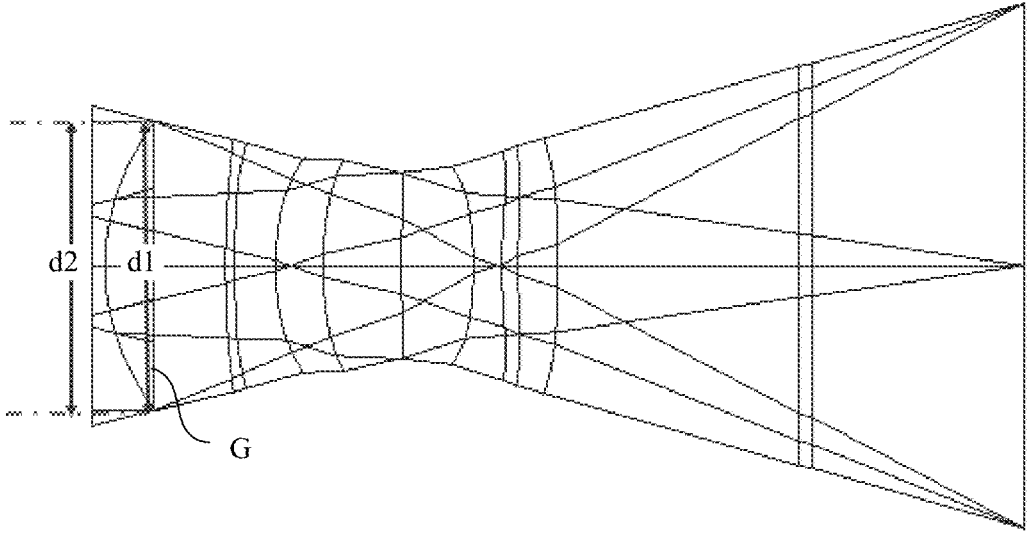
Figure 7:
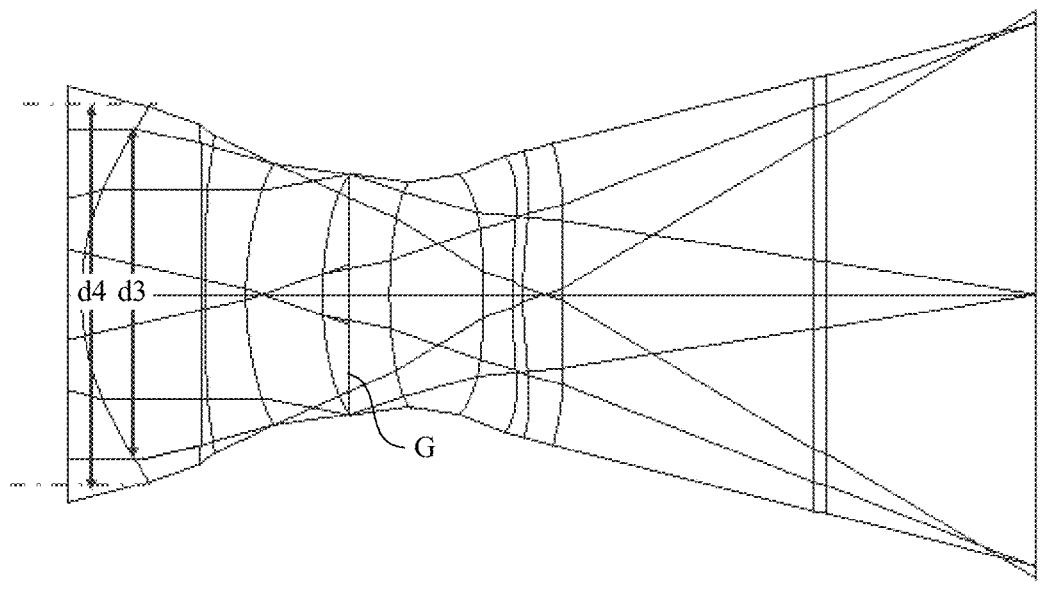
Figure 8:
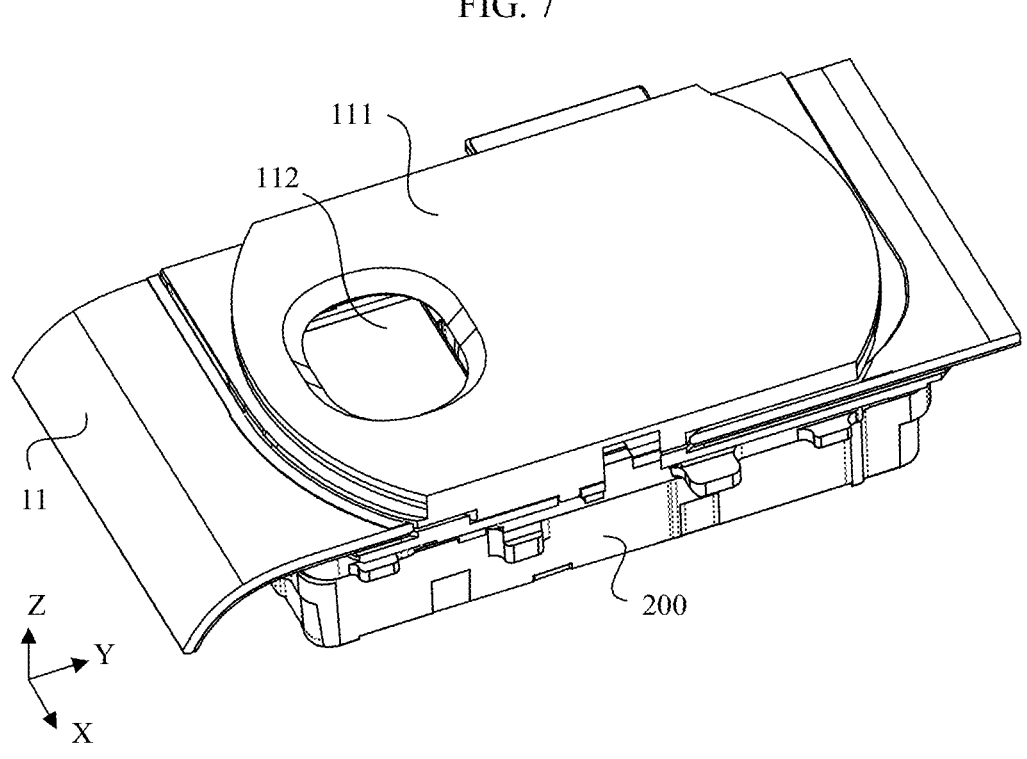
Figure 9:
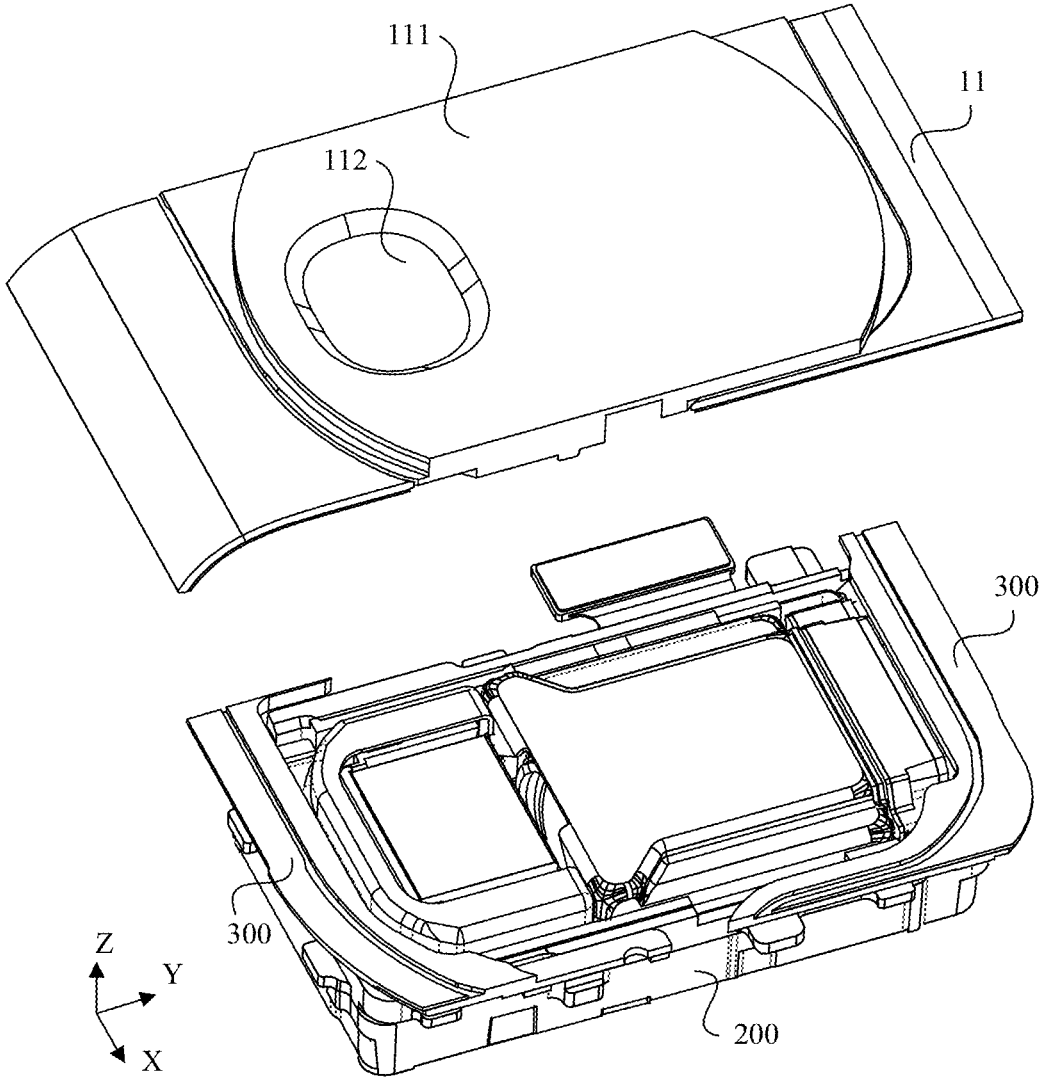
Figure 10:
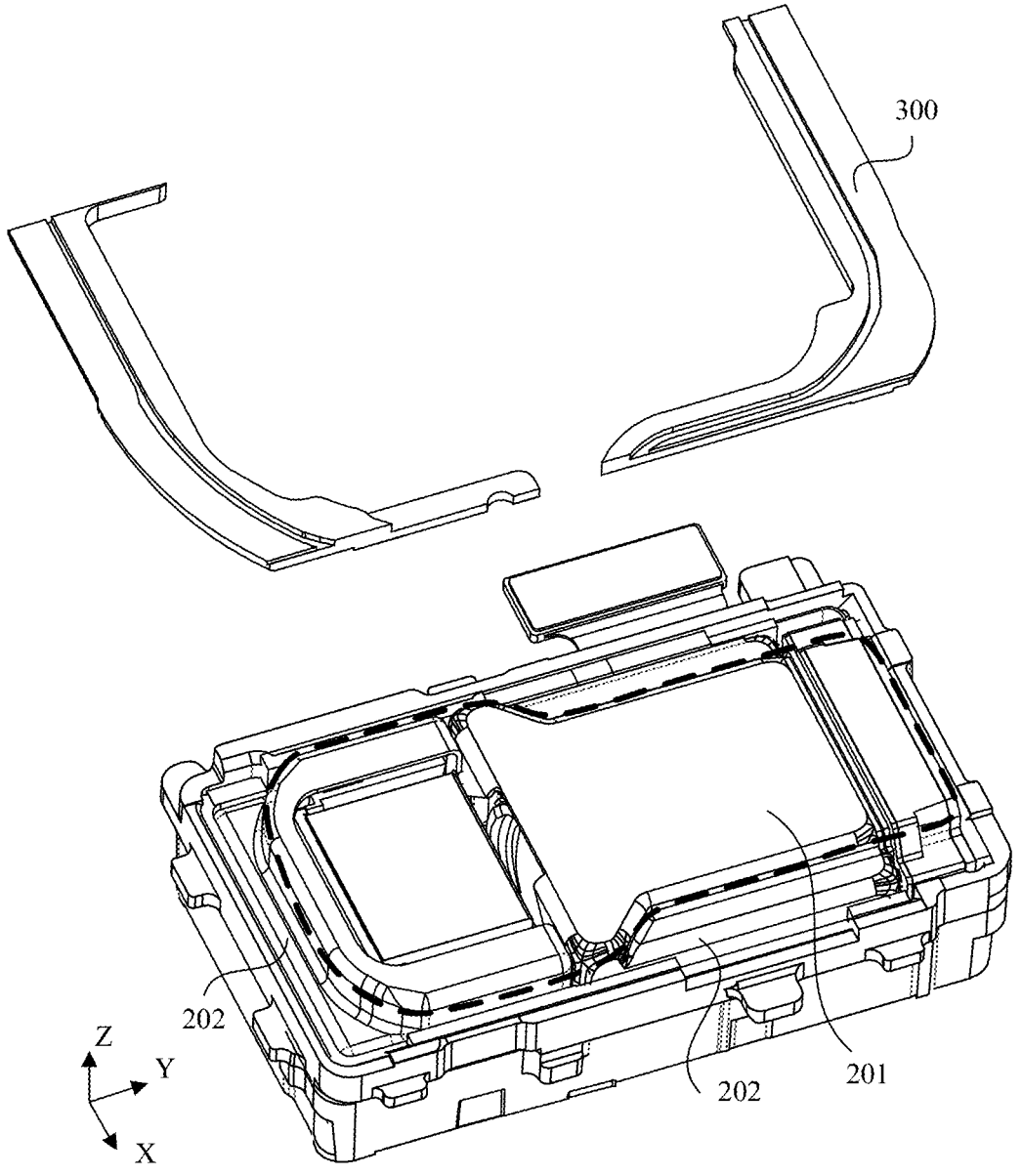
Figure 11:
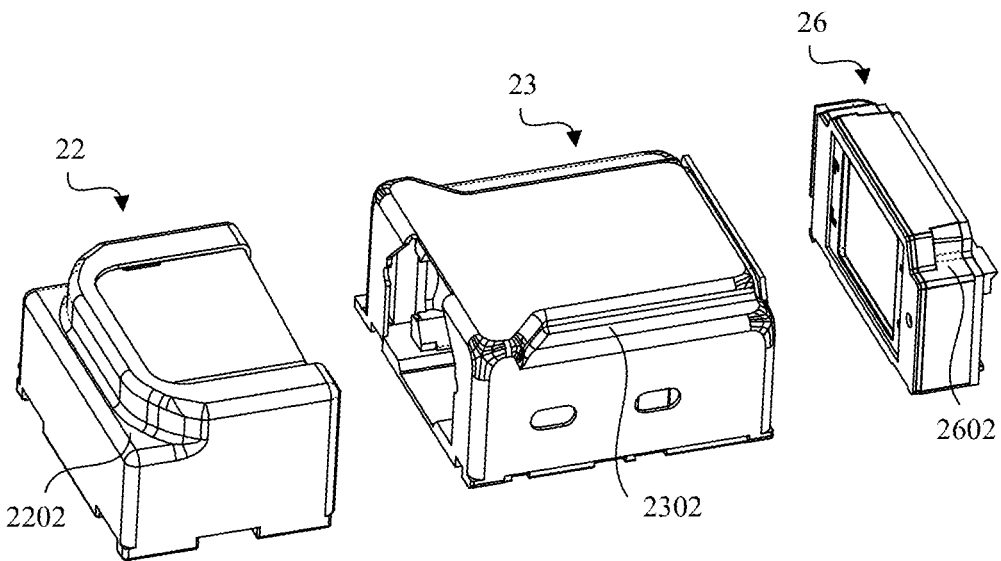
Figure 12:
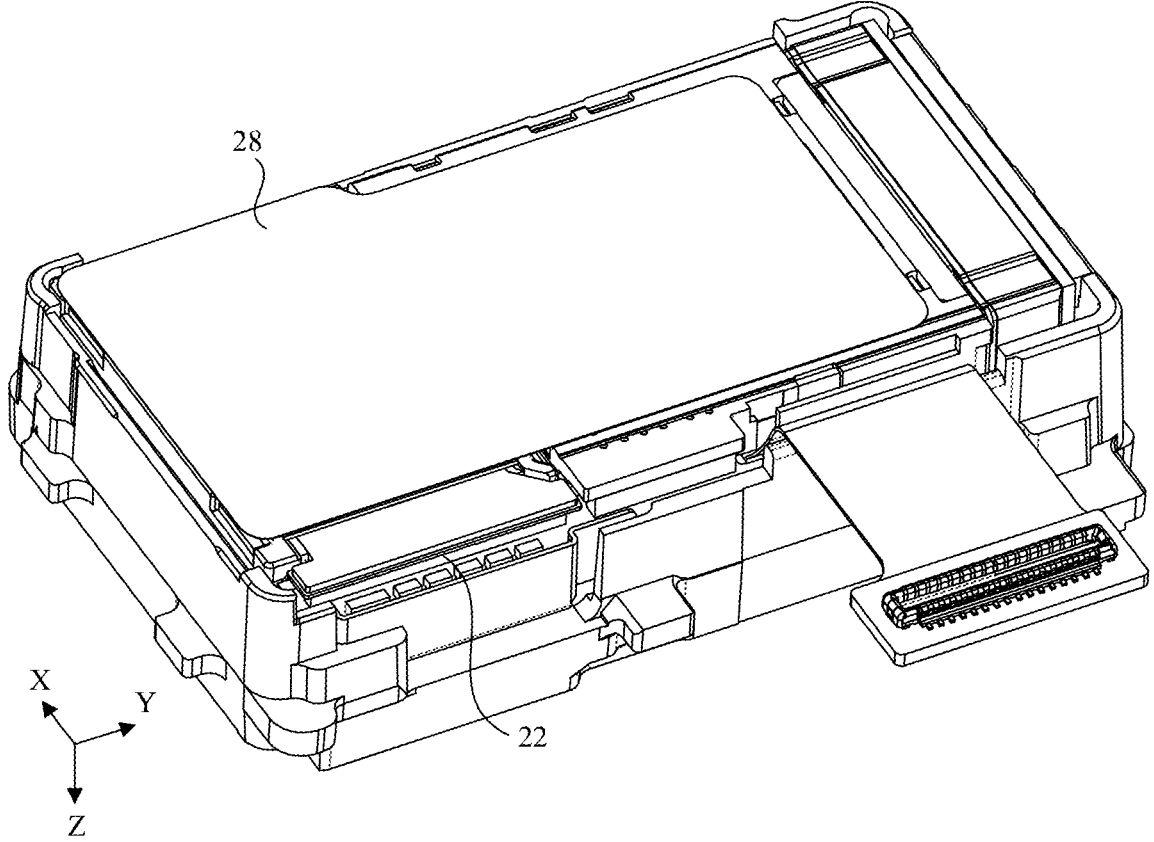
Figure 13:
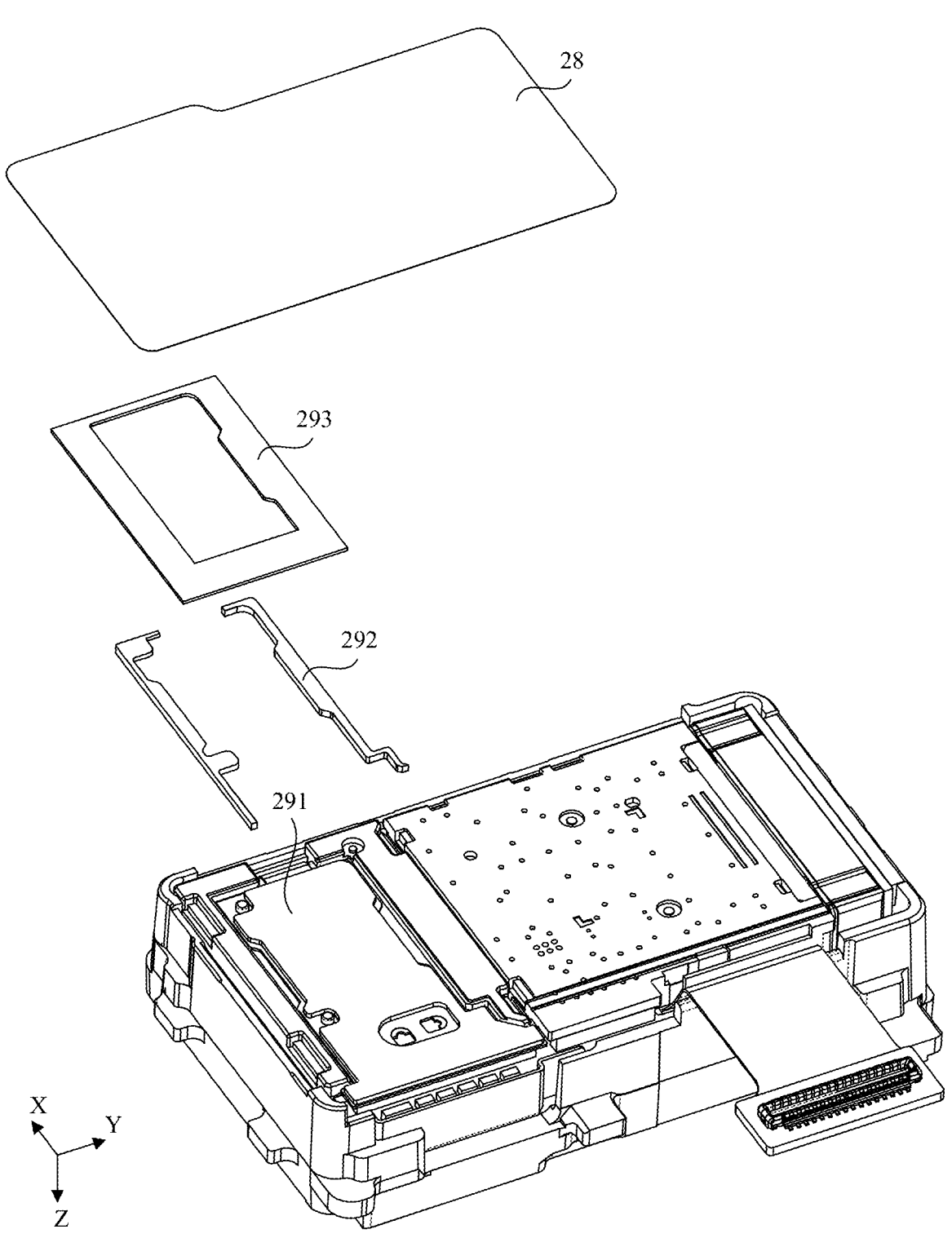
Figure 14:
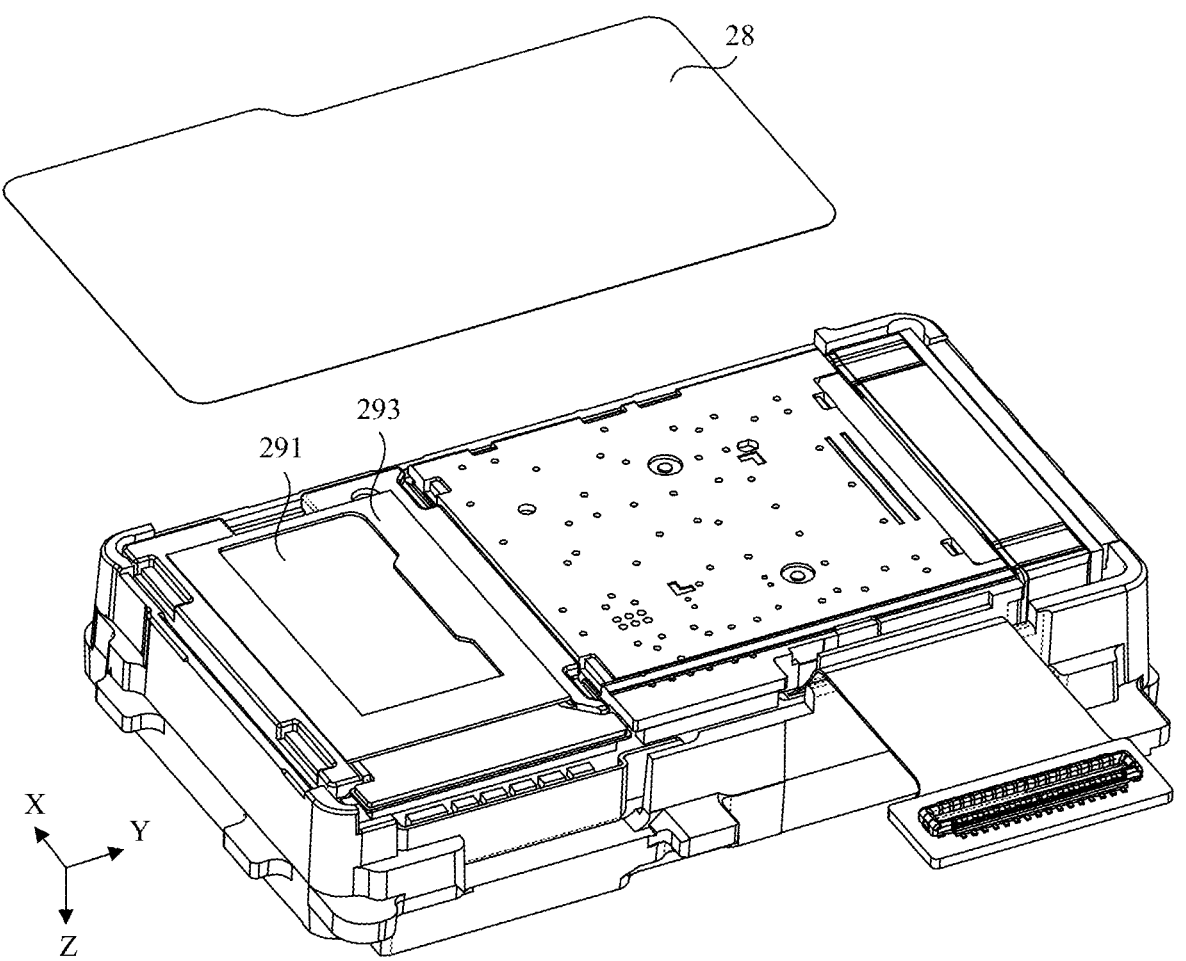
Figure 15:
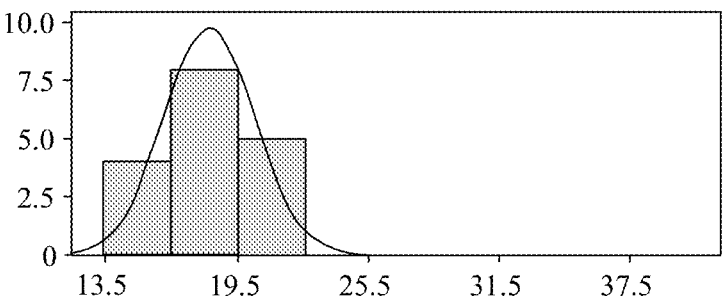
Figure 16:
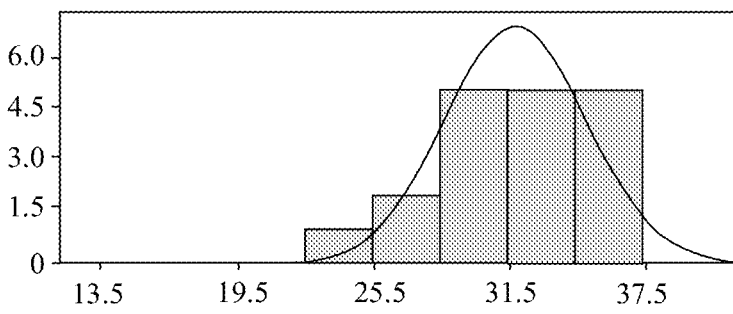

FIG. 2 is a schematic diagram of an exploded structure of an electronic device according to an embodiment of this application;

FIG. 3 is a schematic diagram of a structure of a camera module according to an embodiment of this application;

FIG. 4 is an exploded view of a camera module according to an embodiment of this application;

FIG. 5 is a schematic diagram of a structure of a camera lens according to an embodiment of this application;

FIG. 6 is a schematic diagram of a position relationship between a front-facing stop and a camera lens diameter according to an embodiment of this application;

FIG. 7 is a schematic diagram of a position relationship between a middle stop and a camera lens diameter according to a conventional technology;

FIG. 8 is a schematic diagram of structures of a camera module and a partial rear cover according to an embodiment of this application;

FIG. 9 is a schematic exploded diagram of a camera module, a partial rear cover, and some mechanical parts according to an embodiment of this application;

FIG. 10 is a schematic exploded diagram of a camera module and some mechanical parts according to an embodiment of this application;

FIG. 11 is a schematic diagram of structures of an optical image stabilization motor, an automatic focus motor, and a lens holder according to an embodiment of this application;

FIG. 12 is a schematic diagram of a structure of a camera module from another angle according to an embodiment of this application;

FIG. 13 is a schematic exploded diagram of a Mylar film and a reinforcement adhesive according to an embodiment of this application;

FIG. 14 is a schematic diagram of a process of assembling a Mylar film according to an embodiment of this application;

FIG. 15 is a corresponding falling reliability compression ratio distribution diagram when a reinforcement structure is set by using an injection molding process according to a conventional technology; and FIG. 16 is a corresponding falling reliability compression ratio distribution diagram when a three-layer reinforcement structure is used according to an embodiment of this application.

DESCRIPTIONS OF REFERENCE NUMERALS

100: electronic device; 11: rear cover; 111: camera mounting region; 112: light transmission hole; 12: middle frame; 13: display; 200: camera module; 201: main region; 202: sink region; 21: bracket; 22: optical image stabilization motor; 2202: first sink region; 23: automatic focus motor; 2302: second sink region; 24: reflecting prism; 25: camera lens; 251: lens tube; 252: lens; 253: limiting surface; 26: lens holder; 2602: third sink region; 27: base board; 271: flexible printed circuit; 272: board to board connector; 28: Mylar film; 291: reinforcement board; 292: first reinforcement adhesive; and 293: second reinforcement adhesive.

DETAILED DESCRIPTION OF ILLUSTRATIVE EMBODIMENTS

Embodiments of this application provide an electronic device, including but not limited to an electronic device with a camera, like a mobile phone, a tablet computer, a laptop computer, an ultra-mobile personal computer (ultra-mobile personal computer, UMPC), a handheld computer, a walkie-talkie, a netbook, a POS terminal, a personal digital assistant (personal digital assistant, PDA), a wearable device, a virtual reality device, a wireless USB flash drive, a Bluetooth speaker, a Bluetooth headset, or a vehicle-mounted apparatus.

In embodiments of this application, a mobile phone is used as an example of the foregoing electronic device to specifically describe a structure of the electronic device.

It should be noted that, in the accompanying drawings of embodiments of this application, an X axis may be defined as a length direction of an electronic device 100, a Y axis may be defined as a width direction of the electronic device 100, and a Z axis may be defined as a thickness direction of the electronic device 100. More specifically, a positive direction of the X axis may be defined as a direction from bottom to top on a display surface when a user uses the electronic device 100, a positive direction of the Y axis may be defined as a direction from right to left on the display surface when the user uses the electronic device 100, and a positive direction of the Z axis may be defined as a direction pointing from the display surface of the electronic device 100 to the back.

Figure 1:
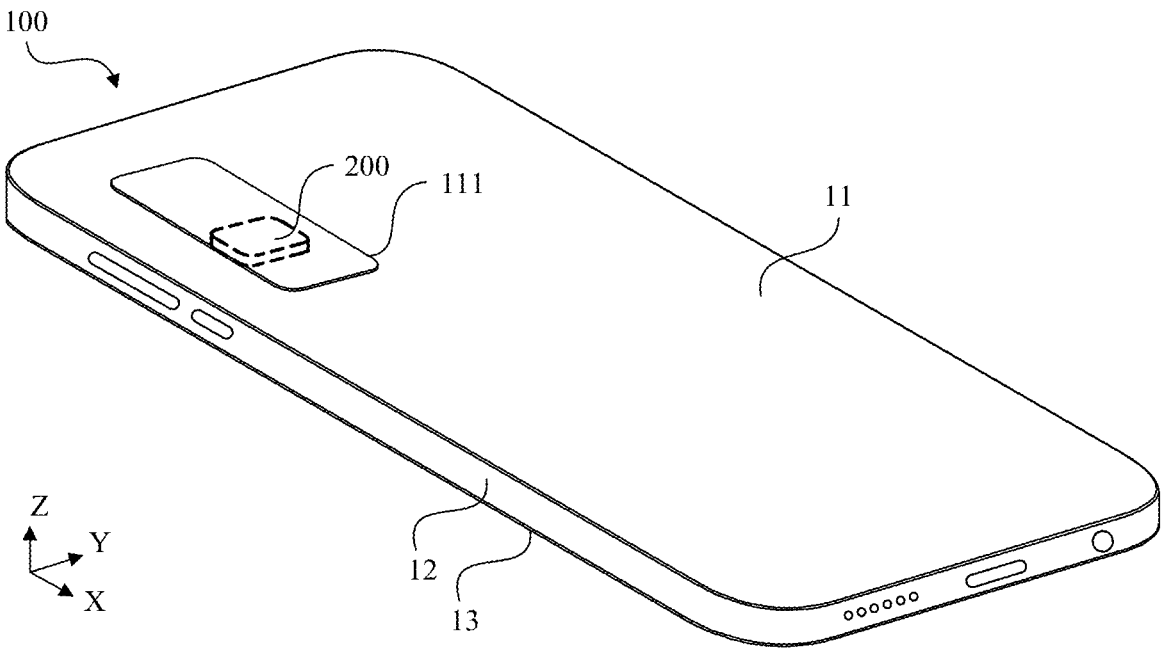
FIG. 1 is a schematic diagram of a structure of an electronic device according to an embodiment of this application.

FIG. 1 is a schematic diagram of a structure of an electronic device according to an embodiment of this application. FIG. 2 is a schematic diagram of an exploded structure of an electronic device according to an embodiment of this application. Refer to FIG. 1 and FIG. 2. An electronic device 100 may include a middle frame 12 and a rear cover 11 and a display 13 that are respectively connected to two sides of the middle frame 12. The display 13, the middle frame 12, and the rear cover 11 jointly enclose accommodating space. A printed circuit board, a battery, a camera module 200, and another electronic component may be disposed in the accommodating space. When a user uses the electronic device 100, the display 13 is placed toward the user as a display surface, and the rear cover 11 is placed away from the user.

The display 13 may be a liquid crystal display (Liquid crystal display, LCD), an organic light-emitting diode (Organic light-emitting diode, OLED) display, or the like. It should be understood that the display 13 may include a display component and a touch component. The display component is configured to output display content to the user, and the touch component is configured to receive a touch operation performed by the user on the display 13. The middle frame 12 may be made of metal, ceramic, glass, or a like material, and the rear cover 11 may be made of metal, ceramic, glass, or a like material. The middle frame 12 and the rear cover 11 may be separately formed, and are fastened through welding, clamping, bonding, or the like. Alternatively, the middle frame 12 and the rear cover 11 may be integrally formed. The rear cover 11 made of the material such as metal, ceramic, or glass may meet requirements for gloss, fashion, and aesthetics of an appearance of the electronic device.

The camera module 200 may be further disposed in the electronic device 100 to implement an image shooting function. The camera module 200 may be used as a front-facing camera or a rear-facing camera of the electronic device 100. The rear-facing camera is used as an example. A camera mounting region 11 is disposed on the rear cover 11. The camera mounting region 11 may be formed by opening a hole on the rear cover 11 and connecting a decorative part and a transparent cover in the opening. The camera module 200 may be connected to the printed circuit board in the electronic device 100. External light may enter the camera module 200 through the camera mounting region

111, or light emitted by the camera module 200 may be transmitted to an external environment through the camera mounting region 111.

A shape of the camera mounting region 11 is not specifically limited in this embodiment. For example, the shape may be a rectangle, a circle, a rounded rectangle, an ellipse, a ring, or a runway. A plurality of camera modules 200 may be disposed in the camera mounting region 111. Types of the camera modules 200 may include, for example, a periscope camera module, an ultra-wide angle camera module, a monochrome camera module, a depth camera module, and a macro-focusing camera module. Arrangement manners of the plurality of camera modules 200 in the camera mounting region 111 are not specifically limited in embodiments of this application. The camera mounting region 111 may be disposed at any position on the rear cover 11, for example, disposed at an upper central position or an upper right position of the rear cover 11, or disposed at a position close to an upper left corner in FIG. 1 and FIG. 2.

Currently, the electronic device 100 is prone to be designed with a large screen and a narrow body. For the camera module 200, optical zoom with a larger magnification factor, an imaging effect with higher resolution, and a more stable image stabilization capability are required. The improvement of requirements for imaging shooting effect means that the camera module 200 needs to have a larger size and height, which conflicts with a thin design trend of the electronic device 100.

In a possible implementation, the periscope camera module may be disposed to meet the requirements for image shooting effect of the camera module 200 and thinning of the electronic device 100. An optical axis direction of a camera lens of the periscope camera module is perpendicular to a thickness direction of the electronic device 100. Therefore, a thickness of the electronic device 100 can be reduced while the electronic device 100 has a function of a telephoto camera.

For the periscope camera module, a size of the camera lens affects a stacking height of the module (that is, a stacking height in the thickness direction of the electronic device 100), and therefore affects the thickness of the electronic device 100. When performance such as a focal length of the periscope camera module is fixed, the size of the camera lens needs to meet optical performance, and it is very difficult to reduce the size of the camera lens. To be specific, it is difficult to further reduce the stacking height of the periscope camera module.

In a conventional technology, to resolve a contradiction problem between a thin body and a height of a camera module, protrusion of the camera module 200 is reduced from a visual effect. For example, when the camera module 200 protrudes relative to the rear cover 11, a camera decorative part that protrudes relative to the rear cover 11 in the camera mounting region 11 may be designed as black or another appearance that reduces a visual protrusion effect, to reduce a visual effect of a protrusion degree of the camera module 200. However, in this case, a module structure design of the camera module 200 does not reduce the stacking height of the module. Although the protrusion degree is reduced in the visual effect, an actual protrusion effect is still very obvious.

In another conventional technology, components in the camera module 200 may be designed as two-in-one or multiple-in-one, to reduce the stacking height. For example, a structure like a circuit board in the camera module 200 and an injection-molded part may be combined into one by using an injection molding process, to reduce an overall size and increase component strength. However, the method of combining the two into one by using the injection molding process has a high requirement on the technology, and it is difficult to implement the technology, resulting in disadvantages of low production efficiency and high costs. In addition, the two-in-one injection molding process has a specific thickness design bottom line, and this may still fail to meet a requirement for reducing a stacking thickness.

Based on the foregoing problems, embodiments of this application provide a camera module and an electronic device. A camera lens stop of a periscope camera module is moved forward, so that a camera lens diameter can be reduced compared with that of a middle stop. In addition, because the camera lens diameter is reduced, a size required by a reflecting prism can also be reduced, so that a stacking height of the periscope camera module is reduced, thereby reducing a thickness of the electronic device.

The following specifically describes a structure of the camera module provided in embodiments of this application with reference to the accompanying drawings and specific embodiments. In embodiments of this application, a periscope camera module applied to a mobile phone is used as an example.

FIG. 3 is a schematic diagram of a structure of a camera module according to an embodiment of this application. FIG. 4 is an exploded view of a camera module according to an embodiment of this application. Refer to FIG. 3 and FIG. 4. An embodiment of this application provides a camera module 200. The camera module 200 may include a bracket 21, an optical image stabilization (Optical image stabilization, OIS for short) motor 22, an automatic focus (Automatic Focus, AF for short) motor 23, a reflecting prism 24, a camera lens 25, a lens holder 26, and a base board 27.

The reflecting prism 24 may be disposed in the optical image stabilization motor 22, the camera lens 25 may be disposed in the automatic focus motor 23, and the camera lens 25 may be connected to the lens holder 26. The optical image stabilization motor 22, the automatic focus motor 23, and the lens holder 26 may be disposed within the bracket 21 and are sequentially arranged in a first direction, where the first direction is an optical axis direction of the camera lens 25, namely, a Y direction in the figure. A plane on which the lens holder 26 is located is perpendicular to the optical axis direction of the camera lens 25.

A light incident surface of the camera module 200 is a surface that is of the camera module 200 and that faces a rear cover 11, namely, a top surface of the camera module 200 in the figure. A light emergent surface of the camera module 200 is perpendicular to the optical axis direction of the camera lens 25, and may be the plane on which the lens holder 26 is located. An imaging process of the camera module 200 may be as follows: After light enters the camera module 200 from the light incident surface, a light entrance path is first changed by reflection of the reflecting prism 24, and then the light is propagated along the optical axis direction of the camera lens 25, and enters the lens holder 26. A photosensitive chip may be disposed in the lens holder 26, and the light is illuminated on the photosensitive chip for imaging.

The automatic focus motor 23 is configured to drive the camera lens 25 to move along the optical axis direction, to change a distance between the camera lens 25 and the lens holder 26, to implement focus adjustment. The optical image stabilization motor 22 is configured to drive the reflecting prism 24 to flip, to adjust an optical axis position of incident light relative to the automatic focus motor 23, so as to compensate for jitter generated by the camera module 200 during image shooting, and implement image stabilization during image shooting.

The optical image stabilization motor 22 and the automatic focus motor 23 each may be disposed as a voice coil motor. The voice coil motor may include a magnet and a coil that moves relative to the magnet. A magnitude of a magnetic force between the coil and the magnet may be controlled by inputting different currents into the coil, to control a magnitude of an acting force and generate a required displacement. Specific structures of the optical image stabilization motor 22 and the automatic focus motor 23 are not described in detail in embodiments of this application.

The entire camera module 200 may be in a cuboid structure. In a possible arrangement manner, a length direction, a width direction, and a height direction of the camera module 200 may respectively correspond to a Y direction, an X direction, and a Z direction in the figure, that is, may correspond to a width direction, a length direction, and a thickness direction of an electronic device 100. The surface that is of the camera module 200 and that faces the rear cover 11 of the electronic device 100, namely, the top surface of the camera module 200, is the light incident surface.

The bracket 21 may be disposed as a rectangular frame structure formed by enclosing four side wall surfaces, and a top surface and a bottom surface of the rectangular frame structure are open structures. The optical image stabilization motor 22, the automatic focus motor 23, the lens holder 26, and the base board 27 may be fixedly connected within the bracket 21. A fixed connection manner is not specifically limited in embodiments of this application, for example, may be clamping, screwing, or bonding.

The base board 27 may be a printed circuit board (Printed Circuit Board, PCB for short). The base board 27 may be disposed between the optical image stabilization motor 22, the automatic focus motor 23, the lens holder 26, and a side wall surface of the bracket 21. The base board 27 may be separately electrically connected to the optical image stabilization motor 22, the automatic focus motor 23, and the lens holder 26, and the base board 27 may be connected to a flexible printed circuit (Flexible Printed Circuit, FPC for short) 271. The flexible printed circuit 271 extends out of the bracket 21, and an end of the flexible printed circuit 271 may be connected to a board to board (Board To Board, BTB for short) connector 272, to be fastened to a main board inside the electronic device 100.

In embodiments of this application, in an aspect, a stop of the camera lens 25 may be front-facing, to reduce an overall stacking height of the camera module 200.

It should be noted that a stop refers to an entity that limits a light beam in an optical system, for example, may be an edge or frame of a lens, or a specially disposed screen with a hole. The stop may include an aperture stop and a field stop. The aperture stop is used to limit a size of a point imaging beam on an optical axis, and the field stop is used to limit an imaging range. The stop mentioned in the following embodiments of this application is the aperture stop.

FIG. 5 is a schematic diagram of a structure of a camera lens according to an embodiment of this application. FIG. 6 is a schematic diagram of a position relationship between a stop and a camera lens diameter according to an embodiment of this application. Refer to FIG. 5 and FIG. 6. In embodiments of this application, the camera lens 25 may include a lens tube 251 and a plurality of lenses 252 disposed in the lens tube 251. The plurality of lenses 252 are sequentially arranged in the lens tube 251 from a light inlet side to a light outlet side along an optical axis direction of the camera lens. The light inlet side of the camera lens 25 is defined as a front side, the light outlet side of the camera lens 25 is defined as a rear side, and the plurality of lenses 252 are sequentially arranged from the light inlet side to the light outlet side. A lens on a frontmost side may be defined as a first lens.

In an embodiment of this application, a camera lens stop G may be disposed close to the light inlet side of the lens tube 251. In other words, the stop G is front-facing, instead of being disposed between two lenses 252. For example, the camera lens stop G may be disposed on a periphery of the first lens, or may be disposed on a front side of the first lens, namely, a side that is of the lens 252 and that faces a reflecting prism 24.

It should be understood that an entrance pupil aperture is an effective aperture for limiting an incident light beam, an entrance pupil is an image formed by the stop for a front optical system, and the entrance pupil aperture is an equivalent aperture of the stop in object space. The entrance pupil aperture=an effective focal length/a relative aperture. The effective focal length (Effective Focal Length) is an EFL for short, and the relative aperture is an FNO (F-Number). For a camera module 200 whose optical characteristic is determined, the entrance pupil aperture is a determined value.

For example, the stop G is disposed on the periphery of the first lens. Refer to FIG. 6. An aperture of the stop is the same as a diameter d2 of the first lens. In this case, there is no out-of-axis light offset, and an entrance pupil aperture d1 is the same as the aperture of the stop. Therefore, the entrance pupil aperture d1 is equal to the diameter d2 of the first lens.

FIG. 7 is a schematic diagram of a position relationship between a middle stop and a camera lens diameter according to a conventional technology. Refer to FIG. 7. In the conventional technology, the stop G is located in a middle part of the camera lens 25, and is disposed between adjacent lenses 252, and a body structure of the stop G may be an optical shielding film. When the stop G is disposed in the middle, the diameter of the first lens is the entrance pupil aperture plus the out-of-axis light offset. In the figure, d3 represents the entrance pupil aperture, d4 represents the diameter of the first lens, and d4 is greater than d3.

It can be learned from FIG. 6 and FIG. 7 that, when the entrance pupil aperture is a fixed value, compared with those in a case of the middle stop, in a case of the front stop, the diameter of the first lens is reduced, and a diameter size of the camera lens 25 may be reduced by 10% to 20%. In addition, because the diameter of the camera lens 25 is reduced, a size required by the reflecting prism 24 may also be reduced. For a periscope camera module, size reductions of the camera lens 25 and the reflecting prism 24 reduce an overall stacking height of the module. In addition, the size reduction of the reflecting prism 24 is conducive to driving control of the optical image stabilization motor 22 and bonding stability of the reflecting prism 24.

It should be understood that, when the stop is disposed on the periphery of the first lens, as shown in FIG. 5, a stop entity may be limiting surfaces 253, the limiting surfaces 253 are inner wall surfaces that are of the lens tube 251 and that are located on the periphery of the first lens, diameters of the limiting surfaces 253 may be consistent, and widths of the limiting surfaces 253 are not specifically limited in embodiments of this application. For example, the widths of the limiting surfaces 253 may be less than 0.5 mm. Impact of the widths of the limiting surfaces 253 on light may be ignored in embodiments of this application.

It should be additionally noted that the stop may alternatively be disposed on a front side of the first lens, that is, located on a side that is of the first lens and that faces the reflecting prism 24. In this case, the stop entity may be an inner wall surface that is of the lens tube 251 and that is located on the front side of the first lens, or may be a structure like a light shielding film disposed on a front side of the lens tube 251.

In embodiments of this application, in another aspect, a sinking step-shaped structure may be disposed around the camera module 200. The sinking step-shaped structure is configured to cooperate with the rear cover 11, and may stack another mechanical part, so that the stacking height of the entire electronic device can be reduced.

FIG. 8 is a schematic diagram of structures of a camera module and a rear cover according to an embodiment of this application. FIG. 9 is a schematic exploded diagram of a camera module, a rear cover, and a mechanical part according to an embodiment of this application. FIG. 10 is a schematic exploded diagram of a camera module and a mechanical part according to an embodiment of this application. It should be understood that, FIG. 8 to FIG. 10 show only partial structures of the rear cover 11 and a mechanical part 300, so that a cooperation relationship between the rear cover 11, the mechanical part 300, and the camera module 200 can be more clearly understood from the figures.

Refer to FIG. 8 to FIG. 10. When the camera module 200 is assembled in the electronic device 100, a top surface of the camera module 200 is cooperatively connected to the rear cover 11, and the camera module 200 is disposed facing a camera mounting region 11. A light transmission hole 112 may be disposed in the camera mounting region 111, and the reflecting prism 24 is disposed facing the light transmission hole 112, so that after entering the camera module 200 through the light transmission hole 112, external light can be smoothly reflected to the camera lens 25 through the reflecting prism 24.

The mechanical part 300 may be disposed between the camera module 200 and the rear cover 11. There are a plurality of specific implementations of the mechanical part 300. The mechanical part 300 may be a structure like a sealing kit or an antenna support. A shape of the mechanical part 300 in the figure is merely an example. In a possible implementation, the mechanical part 300 may include the sealing kit, for example, foam, to seal the camera module 200 and the rear cover 11, and execute a buffer function.

In another possible implementation, the mechanical part 300 may further include the antenna support. The antenna support may be made by using a laser direct structuring (Laser Direct Structuring, LDS) technology, or an antenna may be formed by embedding a metal part into a plastic support. The antenna support is disposed between the camera module 200 and the rear cover 11, and is used as an antenna of the electronic device. In this way, in an aspect, a quantity of antennas of the electronic device 100 can be increased, and diversity of the antennas can be improved; in another aspect, a camera decorative part and a transparent cover that are disposed in the camera mounting region 11, and an electronic component and a metal part inside the electronic device 100 do not easily interfere with the antenna. Therefore, antenna performance can be improved.

The camera module 200 may include a main region 201 and a sink region 202. The main region 201 is a region in a dashed box in FIG. 10, and the sink region 202 is a region outside the dashed box in FIG. 10. The sink region 202 may be disposed around the main region 201. The sink region 202 is disposed in a concave manner relative to the main region 201, and there is a height difference. A height of the camera module 200 in the sink region 202 is less than a height of the camera module 200 in the main region 201.

When the camera module 200 cooperates with the rear cover 11, accommodation space may be formed between the sink region 202 and the rear cover 11, to accommodate the mechanical part 300. The mechanical part 300 may be clamped between the sink region 202 and the rear cover 11, or the mechanical part 300 may be fixedly connected to the sink region 202, or the mechanical part 300 may be fastened to the rear cover 11.

It should be understood that, the sink region 202 is disposed on the camera module 200, so that mechanical parts 300 may be stacked between the sink region 202 and the rear cover 11. In this way, not only a stacking height of the entire system can be reduced, and but also structural compactness inside the entire system can be improved.

FIG. 11 is a schematic diagram of structures of an optical image stabilization motor, an automatic focus motor, and a lens holder according to an embodiment of this application. Refer to FIG. 1*i*. A first sink region 2202 may be disposed on an optical image stabilization motor 22, and the first sink region 2202 may be disposed on a side that is of the optical image stabilization motor 22 and that faces away from an automatic focus motor 23. A second sink region 2302 may be disposed on the automatic focus motor 23, and the second sink region 2302 may be disposed on two sides in a length direction of a camera module. A third sink region 2602 may be disposed on the lens holder 26, and the third sink region 2602 may be disposed on two sides in a length direction of the lens holder 26.

The first sink region 2202, the second sink region 2302, and the third sink region 2602 jointly form a sink region 202, and the three sink regions may be connected to each other, or may be disposed at intervals. The sink region 202 may occupy all lengths around a main region 201, or may occupy only a part of lengths around a main region 201. Sink regions are correspondingly disposed on the optical image stabilization motor 22, the automatic focus motor 23, and the lens holder 26, so that an area of the sink region can be increased, and space utilization can be improved.

It should be noted that, after the sink regions are disposed, volumes of the optical image stabilization motor 22, the automatic focus motor 23, and the lens holder 26 are reduced. In this case, internal structures of the optical image stabilization motor 22, the automatic focus motor 23, and the lens holder 26 may be adaptively improved. When the internal structures are more compact, sinking is implemented in appearance. Specific improvement of the internal structures is not described in detail in embodiments of this application.

In a possible implementation, a height difference between the sink region 202 and the main region 201 may be 1 mm to 2 mm, so that a stacking height of the entire system can be reduced by 1 mm to 2 mm.

In addition, it should be additionally noted that an edge of a bracket 21 may be flush with a surface on which the sink region 202 is located, so that the bracket 21 can avoid a mechanical part 300, and accommodation space between a camera module 200 and a rear cover 11 is increased, thereby facilitating stacking of the mechanical parts 300.

In embodiments of this application, according to another aspect, three layers of reinforcement structures, namely, a reinforcement board, a thermosetting adhesive, and a Mylar film, are disposed at the bottom of the optical image stabilization motor 22, so that a stacking thickness of the reinforcement structures at the bottom of the optical image stabilization motor 22 can be reduced, thereby reducing an overall stacking height of the camera module 200.

FIG. 12 is a schematic diagram of a structure of a camera module from another angle according to an embodiment of this application. FIG. 13 is a schematic exploded diagram of a Mylar film and a reinforcement adhesive according to an embodiment of this application. FIG. 14 is a schematic diagram of a process of assembling a Mylar film according to an embodiment of this application. Refer to FIG. 12 to FIG. 14. A camera module 200 provided in embodiments of this application may further include a Mylar film 28. The Mylar film 28 may be disposed at the bottom of the camera module 200, that is, disposed on a side away from a light incident surface. The Mylar film 28 is configured to enhance overall performance stability of the camera module 200.

Specifically, a position sensor, for example, a Hall effect sensor, is disposed at the bottom of an optical image stabilization motor 22, and is configured to detect a position of a mover in the optical image stabilization motor 22, to improve image stabilization performance of the optical image stabilization motor 22.

To enhance stability of the position sensor of the optical image stabilization motor 22 relative to the position of a motor mover, in a conventional technology, an insert-molding process may be used to increase a thickness of a mechanical part at the bottom of the optical image stabilization motor 22, to perform a reinforcement function. However, a method for reinforcement by using an intra-mold insert-molding process not only has a surface damage problem caused by the injection molding process, but also requires a stacking thickness greater than 0.25 mm to meet reinforcement performance, and a reinforcement height is large. This is not conducive to reducing an overall stacking height.

In an embodiment of this application, a reinforcement structure at the bottom of the optical image stabilization motor 22 may include a reinforcement board 291, a first reinforcement adhesive 292, a second reinforcement adhesive 293, and a Mylar film 28. A method for mounting the reinforcement structure may be as follows: First, the reinforcement board 291 is attached to and fastened to the bottom of the optical image stabilization motor 22, and a position sensor is blocked by the reinforcement board 291. Then, the first reinforcement adhesive 292 is coated around the reinforcement board 291, and the first reinforcement adhesive 292 may be used to attach and fasten the reinforcement board 291 to the bottom of the optical image stabilization motor 22. After the first reinforcement adhesive 292 is cured, a circle of second reinforcement adhesive 293 may continue to be coated at the bottom of the optical image stabilization motor 22 (including the reinforcement board 291 and the first reinforcement adhesive 292). Finally, the Mylar film 28 is attached, and the Mylar film 28 is fastened through the second reinforcement adhesive 293.

An objective of disposing the reinforcement structure is to enhance the stability of the position sensor of the optical image stabilization motor 22 relative to the position of the motor mover, and ensure performance stability of the optical image stabilization motor 22. Compared with a reinforcement method using the injection molding process in a conventional technology, in the reinforcement solution provided in embodiments of this application, a stacking size is small, the first reinforcement adhesive 292, the second reinforcement adhesive 293, and the Mylar film 28 are disposed, and an overall stacking height does not exceed 1 mm. Compared with an intra-mold insert-molding process for reinforcement in a conventional technology, an overall reinforcement height may be reduced by 0.2 mm, and only 0.1 mm is required, and a surface damage problem caused by the injection molding process can be avoided.

Specifically, after an overall architecture of the camera module 200 and the electronic device 100 is determined, space reserved below the optical image stabilization motor 22 for reinforcement is extremely small, and may be less than or equal to 0.1 mm. In this case, when an injection molding process reinforcement solution is used, space is far insufficient, and a compression ratio requirement cannot be met. However, by using the reinforcement structure in embodiments of this application, a thickness of the Mylar film 28 may be set within 0.03 mm, thicknesses of the first reinforcement adhesive 292 and the second reinforcement adhesive 293 may be set within 0.03 mm, and an overall reinforcement height may not exceed 1 mm.

The reinforcement structure formed by the reinforcement board 291, the first reinforcement adhesive 292, the second reinforcement adhesive 293, and the Mylar film 28 has a buffer function in addition to a reinforcement function. A function of the reinforcement board 291 is to increase structural strength, and the reinforcement board 291 may be disposed as a steel plate. A function of the Mylar film 28 is to buffer and dissipate heat, and the Mylar film 28 may be a structure like graphite, foam, or steel plate. In a possible implementation, the Mylar film 28 may be a copper foil.

The first reinforcement adhesive 292 is mainly used to fasten the reinforcement board 291, and may be a thermosetting adhesive. However, the second reinforcement adhesive 293 needs to consider both the reinforcement function and the buffer function, and therefore has specific requirements on an elastic modulus, hardness, a curing shrinkage rate, and density of the second reinforcement adhesive 293. In a possible implementation, an elastic modulus characteristic of the second reinforcement adhesive 293 is: 1609 MPa at 25° C., 19.83 MPa at 50° C., 12.44 MPa at 80° C., the hardness of the second reinforcement adhesive 293 is 67, the curing shrinkage rate of the second reinforcement adhesive 293 is 0.78%, and the density of the second reinforcement adhesive 293 is 1.24.

In addition, it should be additionally noted that the Mylar film 28 may cover the bottom of the optical image stabilization motor 22 and the automatic focus motor 23, and the Mylar film 28 may be disposed as the copper foil to dissipate heat. This helps improve heat dissipation efficiency of the optical image stabilization motor 22 and the automatic focus motor 23.

FIG. 15 is a corresponding falling reliability compression ratio distribution diagram when a reinforcement structure is set by using an injection molding process according to a conventional technology. FIG. 16 is a corresponding falling reliability compression ratio distribution diagram when a three-layer reinforcement structure is used according to an embodiment of this application. A horizontal coordinate represents a compression ratio (Compression Ratio, CR for short), a vertical coordinate represents a quantity, a bar chart represents a quantity of camera modules distributed at different compression ratios when a falling test is performed on the camera modules, and a curve is fitting of the bar chart. It can be learned by comparing with FIG. 15 and FIG. 16 that, for a motor that uses the three-layer reinforcement structure provided in embodiments of this application, the compression ratio is mainly distributed in a range of 25.5 to 37.5, and for a reinforcement solution provided by using the injection molding process in the conventional technology, the compression ratio is mainly distributed in a range of 13.5 to 22.5. Therefore, the motor that uses the three-layer reinforcement structure provided in embodiments of this application can effectively improve the compression ratio, and this further improves an image stabilization effect of the optical image stabilization motor 22.

Embodiments of this application provide a camera module. In an aspect, a stop of a camera lens may be front-facing to reduce a diameter of the camera lens, to reduce sizes of the camera lens and a reflecting prism, that is, a stacking height of the module may be reduced from a structure design aspect. In another aspect, a sinking step-shaped structure may be disposed around the camera module, and the sinking step-shaped structure is used to cooperate with a rear cover, and may stack another mechanical part, that is, the stacking height of the module may be reduced from a stacking cooperation aspect. In still another aspect, the three layers of reinforcement structures, namely, the reinforcement board, the reinforcement adhesive, and the Mylar film, are disposed at the bottom of the optical image stabilization motor, so that a stacking thickness of the reinforcement structure at the bottom of the optical image stabilization motor can be reduced, that is, the stacking height of the module can be reduced from a processing technology aspect. Therefore, a compact periscope camera module can be provided, and a stacking height of an entire electronic device can be reduced, and this is conducive to a thin design of the electronic device.

Finally, it should be noted that the foregoing embodiments are merely intended for describing the technical solutions in embodiments of this application, instead of limiting the technical solutions. Although the embodiments of this application are described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions in the embodiments of this application.

What is claimed is:

1. A camera device, wherein the camera device comprises:
   a bracket, an optical image stabilization motor, an automatic focus motor, a reflecting prism, a camera lens, and a lens holder;
   wherein the reflecting prism is disposed in the optical image stabilization motor, the camera lens is disposed in the automatic focus motor, and the camera lens is connected to the lens holder;
   wherein the optical image stabilization motor, the automatic focus motor, and the lens holder are disposed within the bracket and are sequentially arranged in an optical axis direction of the camera lens, and a plane on which the lens holder is located is disposed perpendicular to the optical axis direction;
   wherein the camera lens comprises a plurality of lenses that are sequentially arranged from a light inlet side to a light outlet side, the light inlet side is of the camera lens and faces the reflecting prism, a first lens in the plurality of lenses is close to the light inlet side, and a stop of the camera lens is disposed on a periphery of the first lens or disposed on a side that is of the first lens and that faces the reflecting prism;
   wherein an aperture of the stop is a fixed aperture equal to a diameter of the first lens; and
   wherein the camera device is configured to be mounted in an electronic device.

2. The camera device according to claim 1, wherein the camera lens comprises a lens tube and the plurality of lenses disposed in the lens tube, a stop entity is a limiting surface of an inner wall of the lens tube, and the limiting surface is disposed on the periphery of the first lens.

3. The camera device according to claim 1, wherein the camera device further comprises a base board, wherein the optical image stabilization motor, the automatic focus motor, and the lens holder are separately connected to the base board, wherein the base board is mounted within the bracket, and wherein a plane on which the base board is located is perpendicular to the plane on which the lens holder is located.

4. The camera device according to claim 1, wherein the camera device further comprises a reinforcement board, a first reinforcement adhesive, a second reinforcement adhesive, and a Mylar film, wherein a frame of the reinforcement board is bonded to a bottom of the optical image stabilization motor through the first reinforcement adhesive, and wherein the Mylar film is bonded to the reinforcement board through the second reinforcement adhesive.

5. The camera device according to claim 4, wherein the Mylar film is a copper foil.

6. The camera device according to claim 4, wherein a sum of a thickness of the second reinforcement adhesive and a thickness of the Mylar film is less than or equal to 0.1 mm.

7. The camera device according to claim 1, wherein a side of a light incident surface of the camera device comprises a main region and a sink region, the sink region is disposed around the main region, and a height of the sink region is less than a height of the main region.

8. The camera device according to claim 7, wherein the camera device further comprises a mechanical part, the mechanical part is mounted on the sink region, and the mechanical part comprises a sealing kit or an antenna support.

9. The camera device according to claim 7, wherein a first sink region, a second sink region, and a third sink region are respectively disposed on the optical image stabilization motor, the automatic focus motor, and the lens holder.

10. The camera device according to claim 7, wherein an edge of the bracket is flush with a surface on which the sink region is located.

11. The camera device according to claim 7, wherein a height difference between the sink region and the main region is 1 mm to 2 mm.

12. An electronic device, comprising:

a rear cover and a camera device, wherein a camera mounting region is disposed on the rear cover, and the camera device is mounted in the camera mounting region, wherein the camera device comprises a bracket, an optical image stabilization motor, an automatic focus motor, a reflecting prism, a camera lens, and a lens holder;

wherein the reflecting prism is disposed in the optical image stabilization motor, the camera lens is disposed in the automatic focus motor, and the camera lens is connected to the lens holder;

wherein the optical image stabilization motor, the automatic focus motor, and the lens holder are disposed within the bracket and are sequentially arranged in an optical axis direction of the camera lens, and a plane on which the lens holder is located is disposed perpendicular to the optical axis direction; and wherein the camera lens comprises a plurality of lenses that are sequentially arranged from a light inlet side to a light outlet side, the light inlet side is of the camera lens and faces the reflecting prism, a first lens in the plurality of lenses is close to the light inlet side, a stop of the camera lens is disposed on a periphery of the first lens or disposed on a side that is of the first lens and that faces the reflecting prism, and an aperture of the stop is a fixed aperture equal to a diameter of the first lens.

13. The electronic device according to claim 12, wherein the camera lens comprises a lens tube and the plurality of lenses disposed in the lens tube, a stop entity is a limiting surface of an inner wall of the lens tube, and the limiting surface is disposed on the periphery of the first lens.

14. The electronic device according to claim 12, wherein the camera device further comprises a reinforcement board, a first reinforcement adhesive, a second reinforcement adhesive, and a Mylar film, wherein a frame of the reinforcement board is bonded to a bottom of the optical image stabilization motor through the first reinforcement adhesive, and wherein the Mylar film is bonded to the reinforcement board through the second reinforcement adhesive.

15. The electronic device according to claim 12, wherein a side of a light incident surface of the camera device comprises a main region and a sink region, the sink region is disposed around the main region, and a height of the sink region is less than a height of the main region.

16. The electronic device according to claim 15, wherein the camera device further comprises a mechanical part, the mechanical part is mounted on the sink region, and the mechanical part comprises a sealing kit or an antenna support.

17. The electronic device according to claim 15, wherein a first sink region, a second sink region, and a third sink region are respectively disposed on the optical image stabilization motor, the automatic focus motor, and the lens holder.

18. The electronic device according to claim 15, wherein an edge of the bracket is flush with a surface on which the sink region is located.

* * * * *